United States Patent
Shigama

(10) Patent No.: US 12,337,432 B2
(45) Date of Patent: Jun. 24, 2025

(54) LATHE AND METHOD OF DETECTING CUT-OFF TOOL BREAKAGE

(71) Applicant: STAR MICRONICS CO., LTD., Shizuoka (JP)

(72) Inventor: Koichiro Shigama, Shizuoka (JP)

(73) Assignee: STAR MICRONICS CO., LTD., Shizuoka (JP)

(*) Notice: Subject to any disclaimer, the term of this patent is extended or adjusted under 35 U.S.C. 154(b) by 392 days.

(21) Appl. No.: 17/880,911

(22) Filed: Aug. 4, 2022

(65) Prior Publication Data
US 2023/0050037 A1 Feb. 16, 2023

(30) Foreign Application Priority Data
Aug. 10, 2021 (JP) .................... 2021-130743

(51) Int. Cl.
*B23Q 17/09* (2006.01)
*B23B 1/00* (2006.01)

(52) U.S. Cl.
CPC ............ *B23Q 17/0957* (2013.01); *B23B 1/00* (2013.01); *B23B 2270/48* (2013.01)

(58) Field of Classification Search
None
See application file for complete search history.

(56) References Cited

U.S. PATENT DOCUMENTS

| | | | | |
|---|---|---|---|---|
| 4,359,676 A * | 11/1982 | Fujioka | .................. | B23Q 15/26 82/146 |
| 4,612,832 A * | 9/1986 | Ushigoe | .................. | B23B 3/167 82/129 |
| 4,831,907 A * | 5/1989 | Gnann | ...................... | B23B 1/00 82/47 |
| 4,853,680 A * | 8/1989 | Thomas | ............. | B23Q 17/0957 73/104 |
| 5,047,702 A * | 9/1991 | Hanaki | ................ | G05B 19/416 700/169 |
| 5,117,544 A * | 6/1992 | Kousaku | .............. | G05B 19/182 29/DIG. 56 |

(Continued)

FOREIGN PATENT DOCUMENTS

| | | |
|---|---|---|
| JP | H05245740 A | 9/1993 |
| JP | H05301148 A | 11/1993 |
| WO | WO2020105383 A1 | 5/2020 |

OTHER PUBLICATIONS

Official Communication (Communication pursuant to Article 94(3) EPC) for corresponding European application No. EP140178-RBlor dated Nov. 7, 2024; pp. 1-16.

*Primary Examiner* — Hua Lu
(74) *Attorney, Agent, or Firm* — MUNCY, GEISSLER, OLDS & LOWE, P.C.

(57) ABSTRACT

A lathe includes a spindle, an opposite spindle, a tool post, a controller, and a contact-type breakage detector. The controller determines whether the cut-off tool is broken according to a control parameter for controlling at least one of the spindle and the opposite spindle at a first detection timing immediately after the cut-off tool cuts off the bar material while the opposite spindle holds the bar material held by the spindle. The controller determines whether the cut-off tool is broken according to a detection result by the contact-type breakage detector at a second detection timing different from the first detection timing.

9 Claims, 10 Drawing Sheets

(56) References Cited

U.S. PATENT DOCUMENTS

| | | | | |
|---|---|---|---|---|
| 5,181,441 A * | 1/1993 | Okada | B23B 3/06 | 82/1.11 |
| 5,975,746 A * | 11/1999 | Lengsfeld | G05B 19/4062 | 700/177 |
| 6,161,055 A * | 12/2000 | Pryor | G05B 19/4065 | 382/152 |
| 6,609,441 B1 * | 8/2003 | Sugimoto | B23Q 16/065 | 82/120 |
| 6,634,264 B1 * | 10/2003 | Takeuchi | B23Q 16/102 | 82/121 |
| 2002/0183888 A1 * | 12/2002 | Sasaki | B23B 13/02 | 82/127 |
| 2002/0197122 A1 * | 12/2002 | Mizutani | G05B 19/4015 | 82/1.11 |
| 2005/0209730 A1 * | 9/2005 | Grund | G05B 19/4067 | 700/177 |
| 2006/0079384 A1 * | 4/2006 | Yoshida | B23Q 3/15713 | 483/37 |
| 2008/0105094 A1 * | 5/2008 | McMurtry | B23Q 17/0966 | 82/1.11 |
| 2009/0053004 A1 * | 2/2009 | Yamaura | B23Q 3/15706 | 409/203 |
| 2010/0093022 A1 * | 4/2010 | Hayworth | G01N 1/06 | 83/72 |
| 2012/0097411 A1 * | 4/2012 | Yoshino | B23Q 17/10 | 702/145 |
| 2015/0314412 A1 * | 11/2015 | Gordon | B23B 25/065 | 33/379 |
| 2015/0316898 A1 * | 11/2015 | Grigoryev | G05B 19/4069 | 700/81 |
| 2017/0205797 A1 * | 7/2017 | Bohner | G05B 19/402 | |
| 2018/0231953 A1 * | 8/2018 | Watanabe | G05B 13/0265 | |
| 2018/0243833 A1 * | 8/2018 | Tanaka | G05B 19/4065 | |
| 2020/0001420 A1 * | 1/2020 | Sarup | G05B 19/4061 | |
| 2020/0122240 A1 * | 4/2020 | Sawada | G05B 19/401 | |
| 2021/0132102 A1 * | 5/2021 | Fujimaki | G01P 3/02 | |
| 2021/0245257 A1 | 8/2021 | Kaku | | |
| 2022/0193848 A1 * | 6/2022 | Yamane | F16P 3/08 | |
| 2022/0219351 A1 * | 7/2022 | Vesterinen | B27L 5/02 | |
| 2022/0244701 A1 * | 8/2022 | Brand | G05B 19/4065 | |

\* cited by examiner

LATHE AND METHOD OF DETECTING CUT-OFF TOOL BREAKAGE

CROSS-REFERENCE TO RELATED APPLICATIONS

This application claims priority of Japanese Patent Application No. 2021-130743 filed on Aug. 10, 2021. The contents of this application are incorporated herein by reference in their entirety.

BACKGROUND OF THE INVENTION

The present invention relates to a lathe provided with a cut-off tool breakage detector and a method of detecting cut-off tool breakage.

A well-known lathe includes an NC (numerically control) lathe capable of continuously producing products by repeatedly cutting off workpieces from a bar material supplied by a bar feeder. The NC lathe executes front machining on an end of the bar material held by the front spindle with a tool attached to a tool post. Then the back spindle holds the end of the bar material and the cut-off tool attached to the tool post cuts off the bar material to separate the end or the workpiece held by the back spindle from the bar material. The lathe further executes back machining on the workpiece with a tool attached to the tool post and then discharges a product The lathe is provided with means for detecting cut-off tool breakage to ensure separation of the workpiece from the bar material.

A lathe having opposite spindles is disclosed in Unexamined Patent Application Publications No. H05-245740. The lathe is provided with a position deviation detecting means for detecting a position deviation or a difference signal between a position command from an NC apparatus and a position feedback signal detected by a pulse encoder of a headstock feeding motor of a moving headstock. The lathe controls separation of the headstock from a stopped headstook and determines that the workpiece is not separated if the detected position deviation exceeds a set value. The lathe determines that the cut-off tool is broken and accordingly outputs an alarm and shuts off the machine. The lathe is not provided with a sensor that could hit the end of the bar material that remains after the cut-off tool cuts-off the bar material. Such breakage detecting means is a non-mechanical-type breakage detecting means.

SUMMARY

When a fresh bar material is supplied to the front spindle from a bar feeder or when continuous machining is resumed, the lathe generally executes a top cut specifically by cutting off an end of the bar material with a cut-off tool while the back spindle does not hold the bar material. In the case the cut-off tool is broken, the end of the bar material remains, which possibly affects subsequent operations. The conventional non-mechanical-type detecting means is unavailable for cut-off tool breakage detection immediately after the top cut is executed while the back spindle does not hold the bar material held by the front spindle. The conventional non-mechanical-type detecting means is also unavailable for cut-off tool breakage detection at the continuous machining start timing while the back spindle does not hold the bar material held by the front spindle.

It is assumed that the non-mechanical-type breakage detecting means is replaced by a mechanical-type breakage detecting means having a detector adapted to hit the uncut end after the cut-off tool cuts off the bar material. Such mechanical-type breakage detecting means, however, would need time to advance the detector, thereby elongating machining time during continuous machining.

The present invention provides a lathe capable of improving accuracy of cut-off tool breakage detection without elongating machining time during continuous machining and a method of detecting cut-off tool breakage.

A machine tool of the invention includes: a spindle capable of releasably holding a bar material; an opposite spindle capable of releasably holding an end of the bar material protruded from the spindle; a tool post on which a cut-off tool is removably attached to cut off the bar material held by the spindle; a controller adapted to control operations of the spindle, the opposite spindle, and the tool post; and a contact-type breakage detector provided with a sensor retractably advancing to an advancing position where the sensor could hit the end of the bar material if it remains after the cut-off tool cuts off the bar material, the contact-type breakage detector being capable of detecting breakage of the cut-off tool if the sensor hits the end of the bar material in the advancing position. The controller determines whether the cut-off tool is broken according to a control parameter for controlling at least one of the spindle and the opposite spindle at a first detection timing immediately after the cut-off tool cuts off the bar material while the opposite spindle holds the bar material held by the spindle, and whether the cut-off tool is broken according to a detection result by the contact-type breakage detector at a second detection timing different from the first detection timing.

A method of detecting cut-off tool breakage in a lathe including: a spindle capable of releasably holding a bar material; an opposite spindle capable of releasably holding an end of the bar material protruded from the spindle; a tool post on which a cut-off tool is removably attached to cut off the bar material held by the spindle; and a contact-type breakage detector provided with a sensor retractably advancing to an advancing position where the sensor could hit the end of the bar material if it remains after the cut-off tool cuts off the bar material, the contact-type breakage detector being capable of detecting breakage of the cut-off tool if the sensor hits the end of the bar material in the advancing position. The method includes: determining whether the cut-off tool is broken according to a control parameter for controlling at least one of the spindle and the opposite spindle at a first detection timing immediately after the cut-off tool cuts off the bar material while the opposite spindle holds the bar material held by the spindle; and determining whether the cut-off tool is broken according to a detection result by the contact-type breakage detector at a second detection timing different from the first detection timing.

The invention can provide a lathe capable of improving detection accuracy of a cut-off tool breakage without elongating maching time of continuous operation and a method therefor.

DETAILED DESCRIPTION

Figure 1:
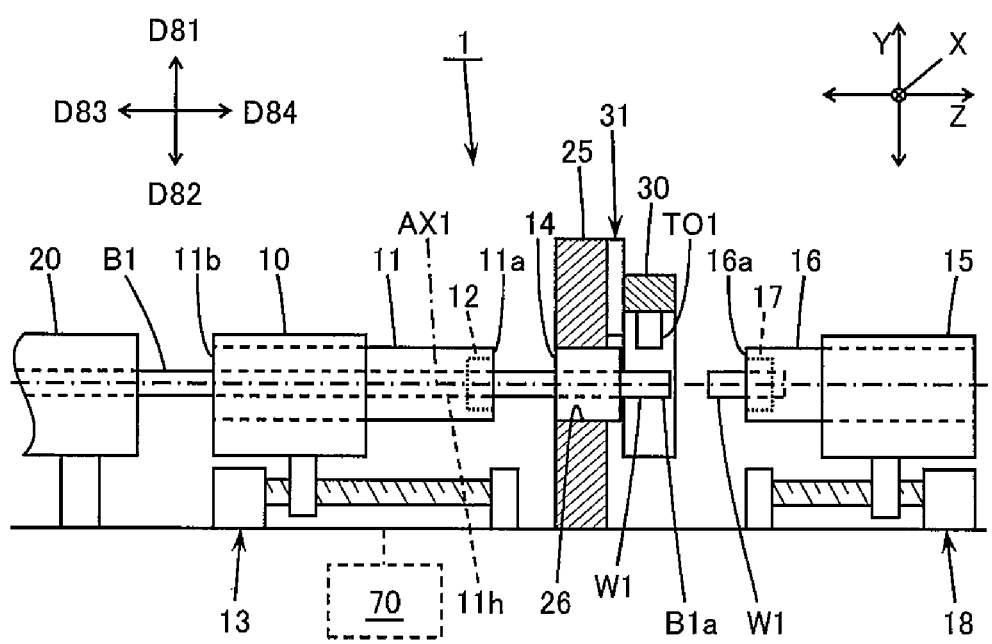
FIG. 1 is an exemplary front view schematically showing a configuration of a lathe provided with a guide bush.

Hereinafter, an embodiment of the present invention will be described referring to the drawings. The invention is not limited to the exemplary embodiments. The features disclosed herein are not necessarily essential to the invention.
(1) Summary of Technology in Scope of the Invention:

Technology of the invention is being described with reference to FIG. 1 to FIG. 10. The drawings only schematically show an example of the invention. They may have a mismatch to each other due to different magnification in each direction. Each element of the technology is not limited to the element denoted by a symbol in the embodiment.

Embodiment 1

Figure 2:
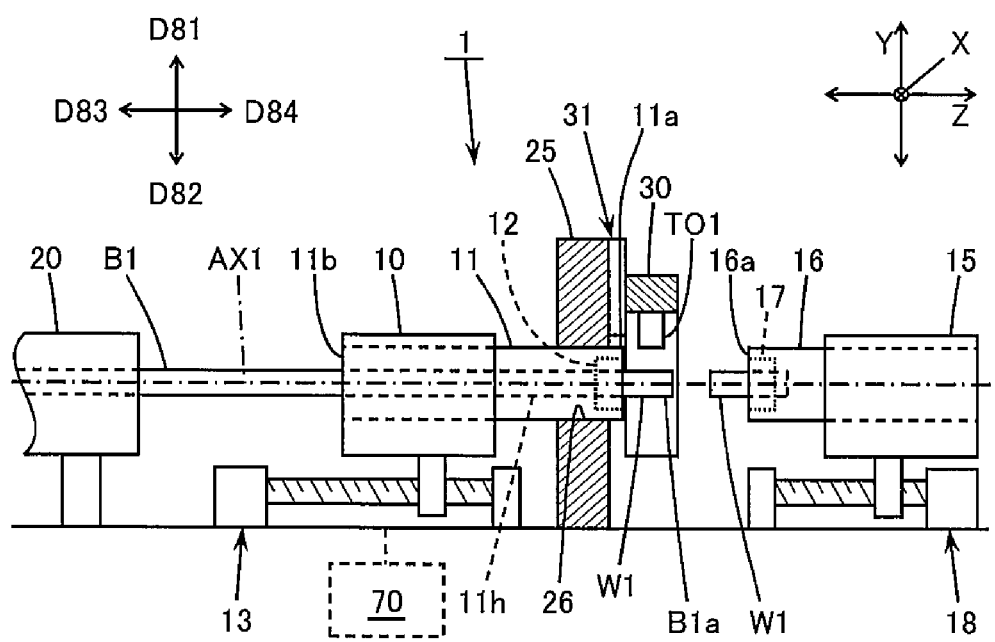
FIG. 2 is an exemplary front view schematically showing a configuration of the lathe from which the guide bush is removed.
Figure 3:
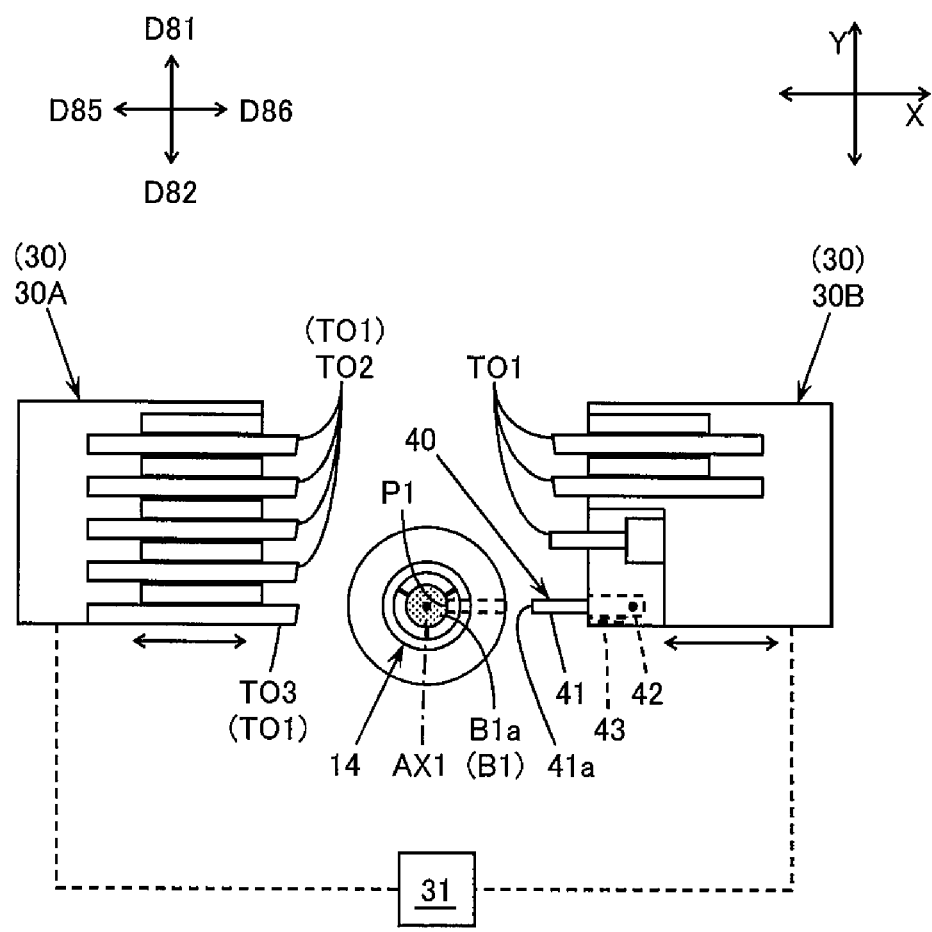
FIG. 3 schematically shows an exemplary tool post provided with a contact-type breakage detector adapted to detect breakage of a cut-off tool.
Figure 7:
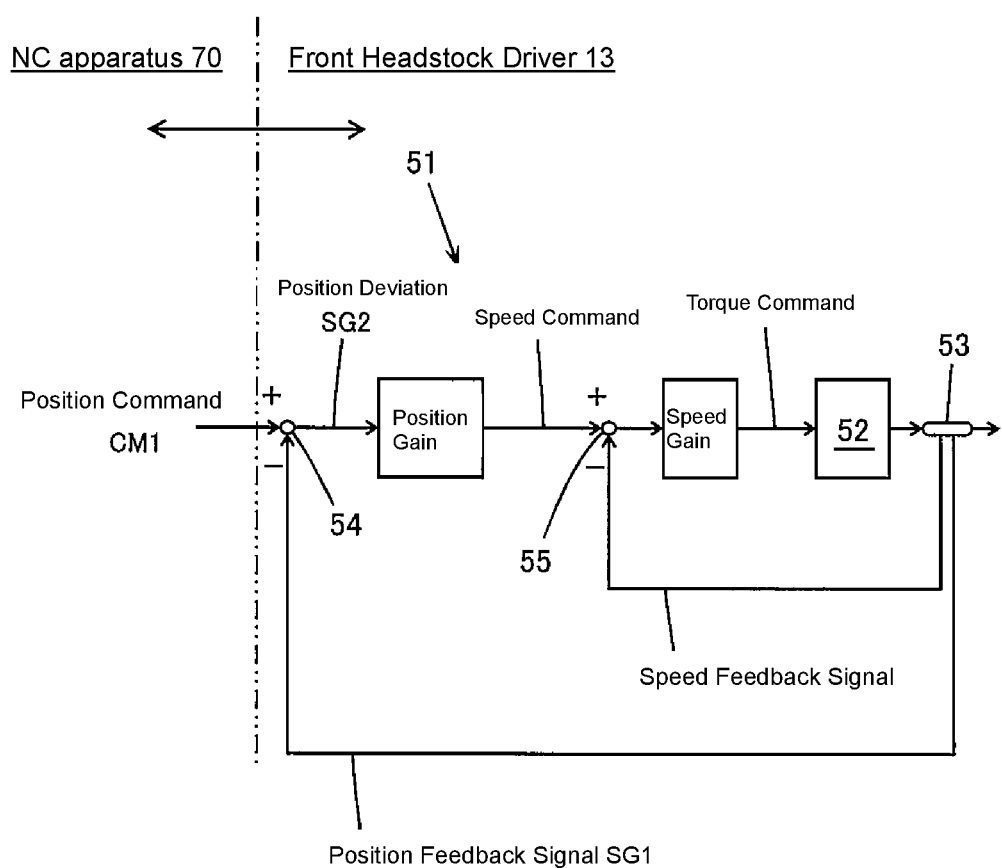
FIG. 7 is an exemplary block diagram schematically showing a control system for a front headstock.

As shown in FIG. 1 to FIG. 3, a lathe 1 of an embodiment of the invention may include a spindle (a front spindle 11, for example), an opposite spindle (a back spindle 16, for example), a tool post 30, a controller (an NC apparatus 70, for example), and a contact-type breakage detector 40. The spindle (11) may releasably hold a bar material B1. The opposite spindle (16) may releasably hold an end B1a of the bar material B1 protruded forward from the spindle (11). A cut-off tool TO3 may be attached to the tool post 30 to cut off the bar material B1 held by the spindle (11). The controller (70) may control operations of the spindle (11), the opposite spindle (16), and the tool post 30. The contact-type breakage detector 40 may have a sensor 41 reciprocating to an advancing position P1 where the sensor 41 could hit the end B1a of the bar material B1 in the case the end B1a of the bar material B1 remains after the cut-off tool TO3 cuts off the bar material B1. The contact-type breakage detector 40 may detect that the cut-off tool TO3 is broken if the sensor 41 hits the end B1a of the bar material B1 in the advancing position P1. The controller (70) may determine whether the cut-off tool TO3 is broken at a first detection timing (a state ST3 in FIG. 4, for example) according to a control parameter (a position deviation SG2 as shown in FIG. 7, for example), which is a parameter for controlling at least one of the spindle (11) and the opposite spindle (16). The first detection timing (ST3) may be a timing immediately after the cut-off tool TO3 cuts off the bar material B1 while the opposite spindle (16) holds the bar material B1 held by the spindle (11). The controller (70) may determine whether the cut-off tool TO3 is broken at a second detection timing (a state ST6 in FIG. 5, for example) according to a detection result by the contact-type breakage detector 40. The second detection timing (ST6) may be a timing different from the first timing (ST3).

At the first detection timing (ST3) immediately after the cut-off tool TO3 cuts off the bar material B1 while the opposite spindle (16) holds the bar material B1 held by the spindle (11), the controller (70) may determine whether the cut-off tool TO3 is broken according to the control parameter (SG2) for controlling at least one of the spindle (11) and the opposite spindle (16). Such determination may not rely on the reciprocating sensor 41, which prevents elongation of machining time during continuous machining. The controller (70) may determine whether the cut-off tool TO3 is broken according to a detection result by the contact-type breakage detector 40 at the second detection timing (ST6) different from the first detection timing (ST3). The controller (70) can determine that the cut-off tool is broken even at the second timing (ST6) when the control parameter (SG2) is unavailable for cut-off tool breakage detection. Accordingly, the embodiment can provide a lathe capable of improving accuracy of cut-off tool breakage detection without elongating machining time during continuous machining.

The first detection timing may include a period from the time the cut-off tool normally cuts off the bar material to the time at least one of the spindle and the opposite spindle starts movement along a spindle axis. The words "first" and "second" as used in the embodiment only mean identification of two similar elements and never mean orders of the elements. The above remarks may also apply to the following embodiments.

Embodiment 2

Figure 5:
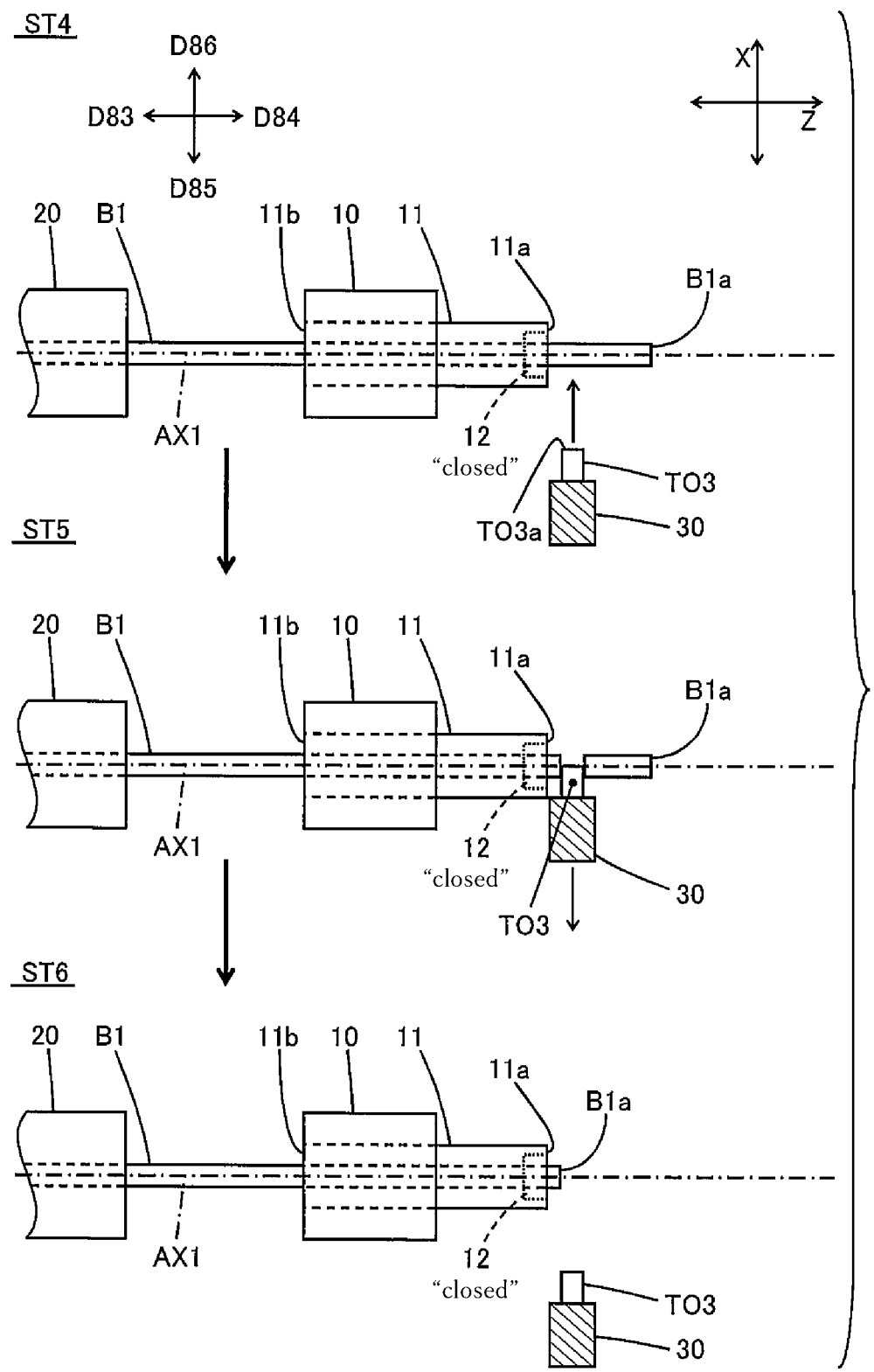
FIG. 5 is an exemplary plan view how the cut-off tool cuts off the bar material during top cut.

As shown in FIG. 5, the second detection timing (ST6) may include the timing immediately after the cut-off tool TO3 cuts off the bar material B1 while the opposite spindle (16) does not hold the bar material B1 held by the spindle (11). Such cut-off may be referred to as a top cut. The end B1a of the bar material B1 could remain immediately after the top cut is executed in the case the cut-off tool TO3 is broken. That would affect subsequent machining operations. The embodiment allows cut-off tool breakage detection even immediately after the top cut is executed. The second detection timing (ST6) may further include a continuous machining start timing. The end B1a of the bar material B1 could remain at the continuous machining start timing regardless of execution of a top cut in the case the cut-off tool TO3 is broken. The embodiment allows cut-off tool breakage detection even at the continuous machining start timing.

The second detection timing may include at least one of the timings: the timing immediately after the top cut is executed and the timing of a start of continuous machining. Such embodiment can provide a suitable example capable of improving accuracy of cut-off tool breakage detection. The second detection timing may include a period from the time the cut-off tool normally cuts off the bar material to the time the spindle starts movement along the spindle axis. The above remarks may also apply to the following embodiments.

Embodiment 3

Figure 10:
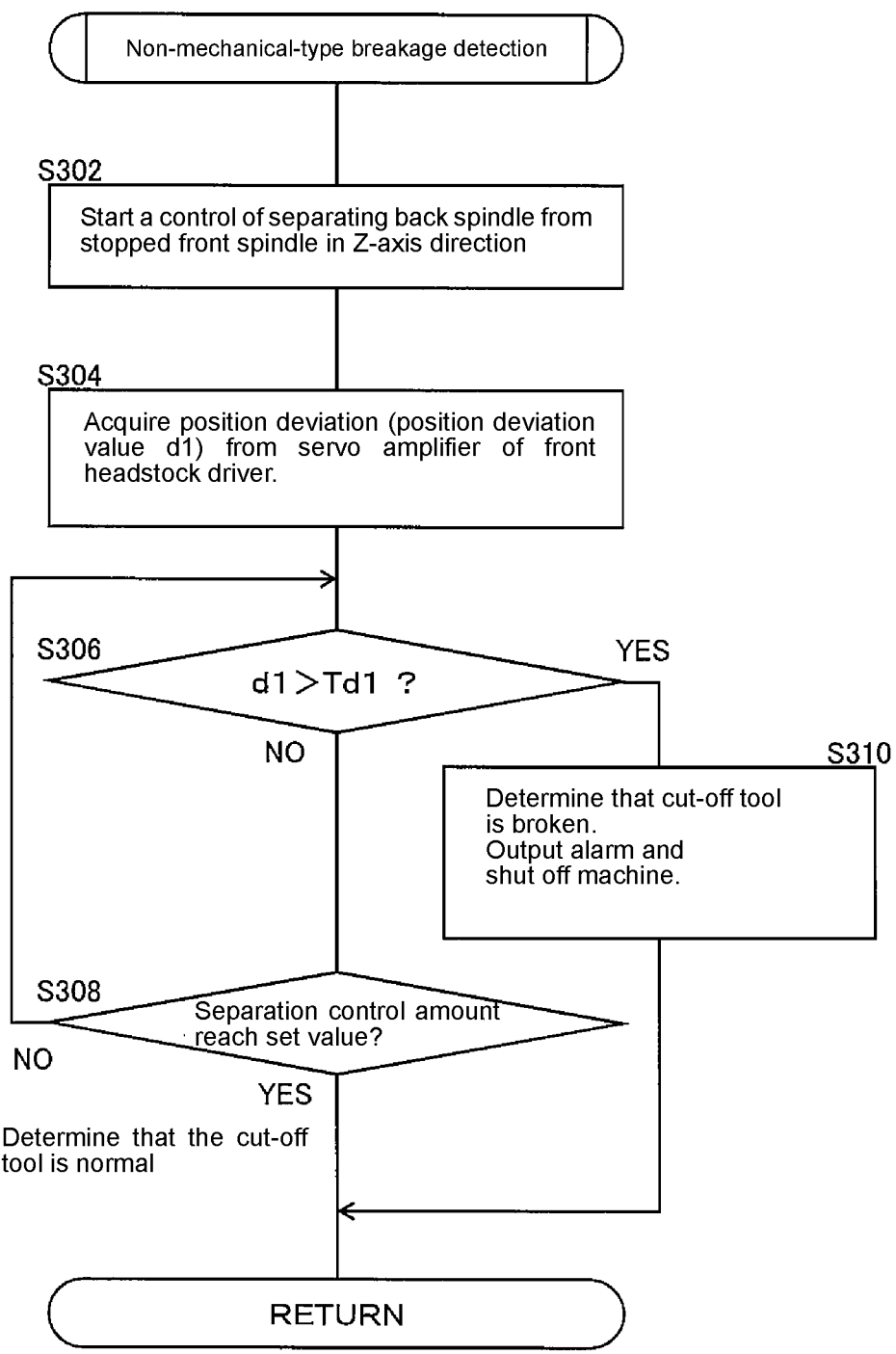
FIG. 10 is an exemplary flow chart schematically showing a non-mechanical-type breakage detection.

One of the spindle (11) and the opposite spindle (16) may be a first spindle (the front spindle 11) and the other may be a second spindle (the back spindle 16). As shown in FIG. 7 and FIG. 10, the control parameter may be the position deviation SG2, which is a difference signal between a position command CM1 and a position feedback signal SG1 for the first spindle (11). The controller (70) may determine that the cut-off tool TO3 is broken if the position deviation SG2 exceeds a set amount (a threshold Td1, for example)

under separation control that separates the second spindle (16) from the stopped first spindle (11) at the first detection timing (ST3). The controller (70) may determine that the cut-off tool TO3 is not broken if the position deviation SG2 does not exceed the set amount (Td1).

In the case the cut-off tool TO3 is broken, the second spindle (16) under the separation control may apply pulling force to the first spindle (11) through the bar material B1. That may cause an increase in the position deviation SG2 for controlling the first spindle (11). If the cut-off tool TO3 is not broken, such pulling force may not be applied to the first spindle (11) since the bar material B1 has been normally cut off. That may not cause an increase in the position deviation SG2. Accordingly, the controller (70) can determine that the cut-off tool TO3 is broken if the position deviation SG2 exceeds the set amount (Td1) under separation control that separates the second spindle (16) from the stopped first spindle (11). The controller (70) can determine that the cut-off tool TO3 is not broken if the position deviation SG2 does not exceed the set amount (Td1) under separation control that separates the second spindle (16) from the stopped first spindle (11). The position deviation SG2 may be the control parameter for controlling the stopped first spindle (11). The position deviation SG2 may not vary according to movement of the first spindle (11). The embodiment can improve the accuracy of cut-off tool breakage detection during continuous machining.

The cut-off tool breakage detection at the first detection timing may be executed by any of (a1) to (a7) means as described below, which are not included in Embodiment 3. The first spindle may be mounted on a first headstock. The first headstock may be driven by a first headstock feed motor. The first spindle is rotated by a first spindle rotating motor. The second spindle may be mounted on a second headstock. The second headstock may be driven by a second headstock feed motor. The second spindle is rotated by a second spindle rotating motor.

(a1) Means for determining whether deviation of an actual position of the first spindle from a commanded position with respect to a spindle axis direction exceeds a set amount under separation control that separates the second spindle from the stopped first spindle.
(a2) Means for determining whether a torque for the first headstock feed motor exceeds a set amount under separation control that separates the second spindle from the stopped first spindle.
(a3) Means for determining whether the position deviation exceeds a set amount under separation control that separates the first spindle from the stopped second spindle.
(a4) Means for determining whether deviation of an actual position of the first spindle from a commanded position with respect to a spindle axis direction exceeds a set amount under separation control that separates the first spindle from the stopped second spindle.
(a5) Means for determining whether a torque for the first headstock feed motor exceeds a set amount under separation control that separates the first spindle from the stopped second spindle.
(a6) Means for determining whether deviation of an actual rotational position of the first spindle from a commanded rotational position exceeds a set amount under rotation control that rotates the second spindle with respect to the first spindle.
(a7) Means for determining whether a torque for the first spindle rotating motor exceeds a set amount under rotation control that rotates the second spindle with respect to the first spindle.

Embodiment 4

As shown in FIG. 3, the contact-type breakage detector 40 may include a sensor driver (a cylinder 42, for example) adapted to advance the sensor 41 in a direction (an X-axis direction, for example) perpendicular to a central axis of the spindle (11) (a spindle axis AX1, for example). The sensor 41 may advance toward the spindle axis (AX1). The contact-type breakage detector 40 may include a contact detector (a position sensor 43, for example) adapted to detect whether the advanced sensor 41 hits the end B1a of the bar material B1. The contact-type breakage detector 40 may detect that the cut-off tool TO3 is broken if the contact detector (43) detects that the advanced sensor 41 hits the end B1a of the bar material B1. The embodiment provides suitable means for cut-off tool breakage detection at the timing immediately after the top cut is executed and at the continuous machining start timing.

Embodiment 4'

Another example of the Embodiment 4 is being described. The contact-type breakage detector 40 may include the cylinder 42 adapted to hold the sensor 41 retractably in the direction (the X-axis direction, for example) perpendicular to the central axis of the spindle (11) (the spindle axis AX1, for example). The contact-type breakage detector 40 may include the position sensor 43 adapted to detect the position of the sensor 41 with respect to the cylinder 42. The contact-type breakage detector 40 may detect that the cut-off tool TO3 is broken if the position sensor 43 detects that the advanced sensor 41 is in a position not reaching the spindle axis AX1. The embodiment provides suitable means for cut-off tool breakage detection at the timing immediately after the top cut is executed and at the continuous machining start timing.

The contact-type sensor may include any of (b1) to (b3) means as described below. The tool post may be driven by a tool post feed motor. The tool post feed motor may receive a torque command from a tool post servo amplifier.
(b1) Means for moving the sensor toward the spindle axis by a rotation driver (an example of the sensor driver), detecting a stop position of the sensor by a stop position detector (an example of the contact detector) and then determining whether the sensor stops at the spindle axis.
(b2) Means for advancing the sensor mounted on the tool post toward the spindle axis and then determining whether a torque for the tool post feed motor (an example of the sensor driver) given by the tool post servo amplifier (an example of the contact detector) exceeds a set amount. If the touque exceeds the set amount, the sensor may hit the end of the bar material. The controller may determine that the cut-off tool is broken if the touque exceeds the set amount.
(b3) Means for advancing the tool post provided with a movable sensor and a sensor movement detector toward the spindle axis by the tool post feed motor (an example of the sensor driver) and detecting movement of the sensor by the sensor movement detector (an example of the contact detector). The sensor moves when hitting the end of the bar material. The controller may determine that the cut-off tool is broken if the sensor movement detector detects movement of the sensor.

Embodiment 5

A method of detecting cut-off tool breakage in the lathe 1 including the spindle (11), the opposite spindle (16), the tool post 30, and the contact-type breakage detector 40 may include the following steps (A1) and (A2):

(A1) determining whether the cut-off tool TO3 is broken according to a control parameter (SG2) for controlling at least one of the spindle (11) and the opposite spindle (16) at the first detection timing (ST3) immediately after the cut-off tool TO3 cuts off the bar material B1 while the opposite spindle (16) holds the bar material B1 held by the spindle (11) as shown in a step S120 (FIG. 8) and FIG. 10.

Figure 8:
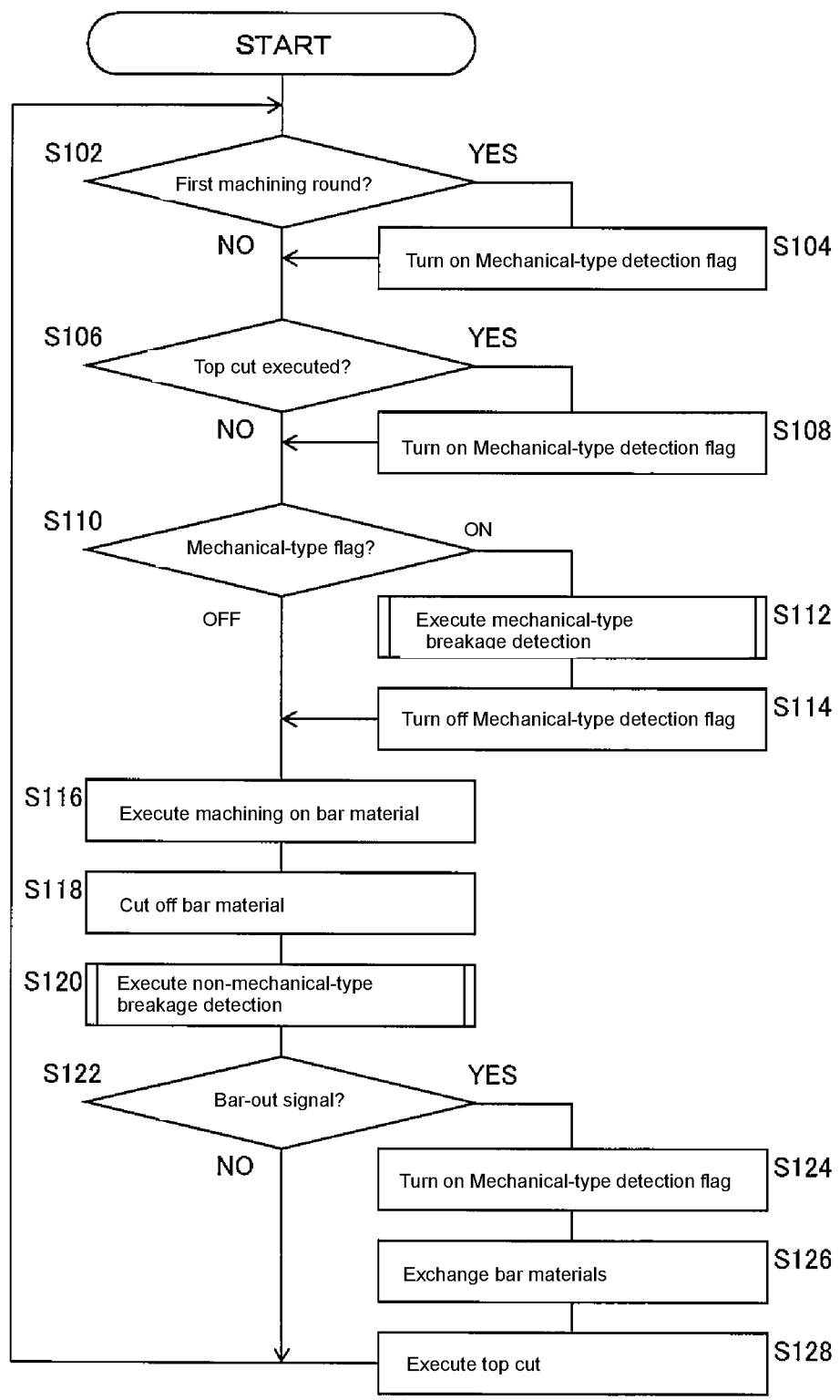
FIG. 8 is an exemplary flow chart schematically showing a machining operation.
Figure 9:
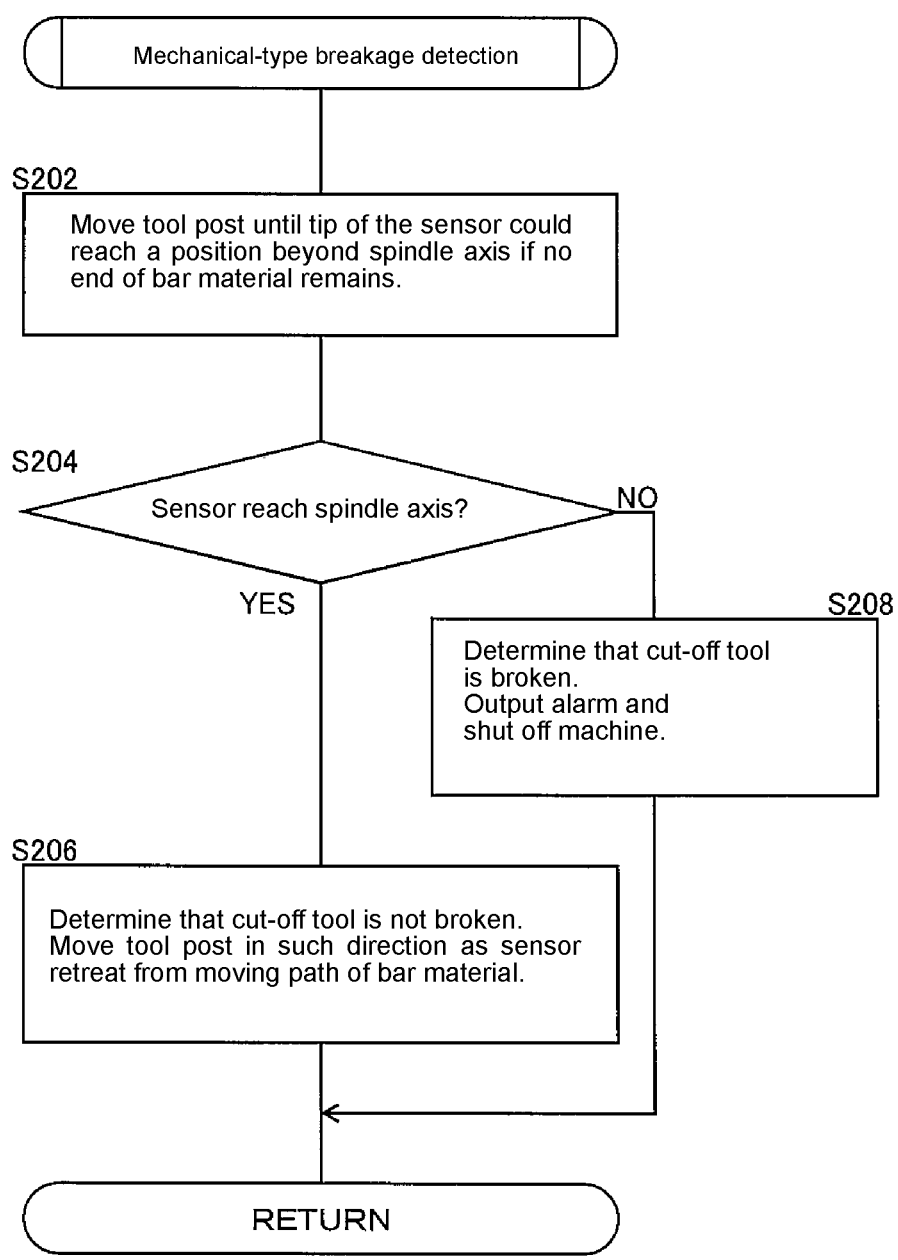
FIG. 9 is an exemplary flow chart schematically showing a mechanical-type breakage detection.

(A2) determining whether the cut-off tool TO3 is broken according to a detection result by the contact-type breakage detector 40 at the second detection timing (ST6) different from the first detection timing (ST3) as shown in a step S112 (FIG. 8) and FIG. 9.

The embodiment can provide a method of detecting cut-off tool breakage in the lathe capable of improving accuracy of cut-off tool breakage detection without elongating machining time during continuous machining.

Figure 4:
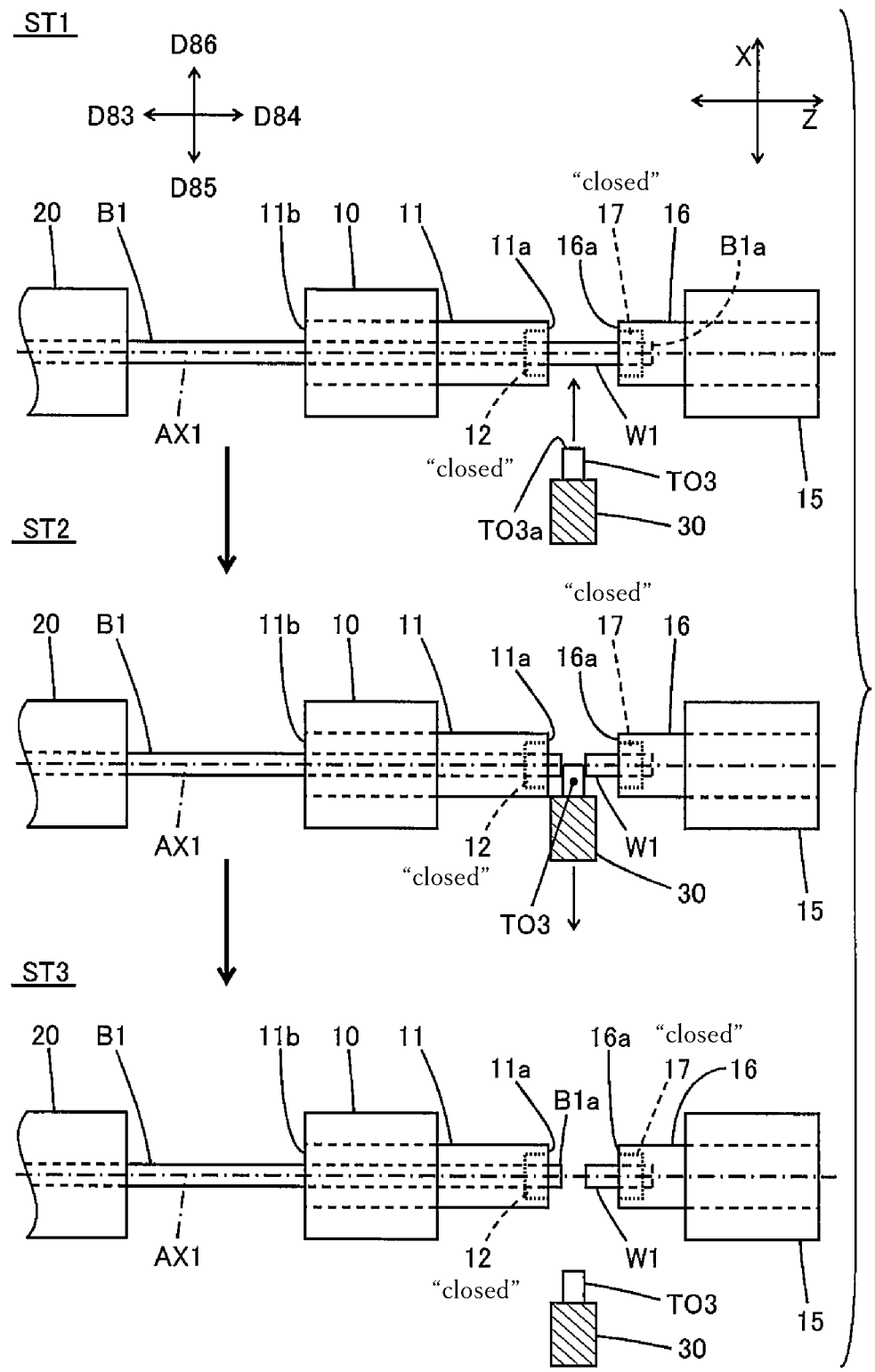
FIG. 4 is an exemplary plan view showing how the cut-off tool cuts off a bar material during continuous machining.

(2) Exemplary Configuration of the Lathe:

FIG. 1 is an exemplary front view schematically showing a configuration of the lathe 1 provided with a guide bush 14. FIG. 2 is an exemplary front view schematically showing a configuration of the lathe 1 from which the guide bush 14 is removed. FIG. 3 schematically shows the exemplary tool post 30 provided with the contact-type breakage detector 40 with a drawing of the guide bush 14 and the bar material B1, where the bar material B1 is shaded only for visibility. FIG. 4 is an exemplary plan view showing how the cut-off tool TO3 cuts off the bar material B1 during continuous machining. FIG. 5 is an exemplary plan view showing how the cut-off tool TO3 cuts off the bar material B1 during top cut.

In FIG. 1 to FIG. 5, a symbol D81 denotes an upper direction, a symbol D82 denotes a lower direction, a symbol D83 denotes a left direction, a symbol D84 denotes a right direction, a symbol D85 denotes a front direction, and a symbol D86 denotes a rear direction, all of which may be the directions viewing the lathe 1 in FIG. 1. Control axes of the lathe 1 may include an X-axis or "X", a Y-axis or "Y", and a Z-axis or "Z". A Z-axis direction may be a horizontal direction along the spindle axis AX1 which is a rotational center of the bar material B1. An X-axis direction may be a horizontal direction perpendicular to the Z-axis. A Y-axis direction may be a vertical direction perpendicular to the Z-axis. The Z-axis and the X-axis may cross but may not be perpendicular. The Z-axis and the Y-axis may cross but may not be perpendicular. The X-axis and the Y-axis may cross but may not be perpendicular. The drawings only show exemplary views for explanation and never limit the scope of the invention. Description of positional relationship of elements are only examples. The invention includes an inverse relationship of things such as inversed left and right directions and inversed rotations. The same direction or position may include a deviation from a strict coincidence.

The lathe 1 may include an NC lathe including a front headstock 10, a front headstock driver 13, a back headstock 15, a back headstock driver 18, a supporting bed 25, the tool post 30, a tool post driver 31, the contact-type breakage detector 40, and the NC (numerical control) apparatus 70. The NC apparatus 70 may be an example of the controller. The front headstock 10 may incorporate the front spindle 11. The front spindle 11 may releasably hold the bar material B1 that a bar feeder 20 may insert from the back. A front end 11a of the front spindle 11 may face the back spindle 16 while a back end 11b thereof may face the bar feeder 20. The front spindle 11 may have a through-hole 11h extended along the spindle axis AX1. The bar material B1 may be inserted into the through-hole 11a from the back. The back headstock 15 may incorporate the back spindle 16. The back spindle 16 as an example of the opposite spindle may releasably hold the end B1a of the bar material B1 protruded from the front end 11a of the front spindle 11. A front end 16a of the back spindle 16 may face the front end 11a of the front spindle 11. The front spindle 11 and the back spindle 16 may face each other. A forward direction of the front spindle 11 may be a direction that the bar material B1 is pushed out from the front spindle 11, which is the right direction D84 in FIG. 1. A backward direction of the front spindle 11 may be a direction toward the bar feeder 20, which is the left direction D83 in FIG. 1. A forward direction of the back spindle 16 may be a direction toward the front spindle 11, which is the left direction D83 in FIG. 1. The supporting bed 25 may have a mounting hole 26 where the guide bush 14 may be attached as shown in FIG. 1 or the front end of the front spindle 11 may be inserted as shown in FIG. 2. The lathe 1 may be a lathe of spindle sliding type removably provided with the guide bush 14.

Figure 6:
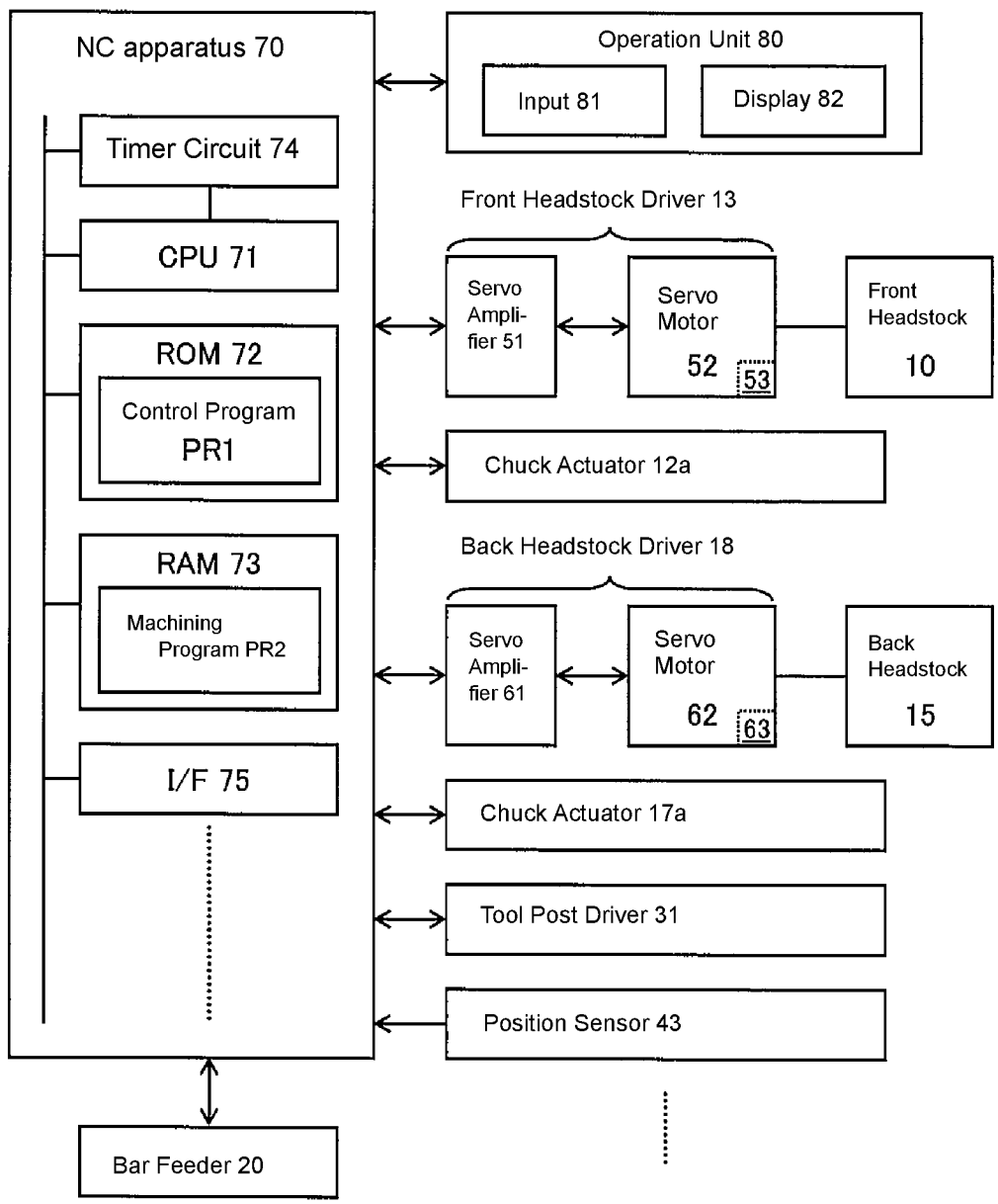
FIG. 6 is an exemplary block diagram schematically showing a configuration of an electrical circuit of the lathe.

The front spindle 11 may include a chuck 12 at a portion thereof including the front end 11a. The chuck 12 may releasably tighten the bar material B1. The front spindle 11 holding the bar material B1 may be rotatable on the spindle axis AX1. The NC apparatus 70 may control the chuck 12 by driving a chuck actuator 12a as shown in FIG. 6. The chuck 12 may include a collet. The NC apparatus 70 may control rotation of the front spindle 11 by a not-shown servo motor (a built-in motor, for example). The front headstock driver 13 may drive the front headstock 10 in the Z-axis direction under control of the NC apparatus 70.

The back spindle 16 may include a chuck 17 at a portion thereof including the front end 16a. The chuck 17 may releasably tighten the end B1a of the bar material B1 where front machining has been complete. The back spindle 16 holding the bar material B1 may be rotatable on the spindle axis AX1. A portion of the bar material B1 including the end B1a may be cut off with the cut-off tool TO3 to be separated from the bar material B1 into a workpiece W1. The NC apparatus 70 may control the chuck 17 by driving a chuck actuator 17a as shown in FIG. 6. The chuck 17 may include a collet. The NC apparatus 70 may control rotation of the back spindle 16 by a not-shown servo motor (a built-in motor, for example). The back headstock driver 18 may drive the back headstock 15 in the Z-axis direction under control of the NC apparatus 70. The back headstock driver 18 may move the back headstock 15 incorporating the back spindle 16 in at least one of the X-axis direction and the Y-axis direction. The workpiece W1 separated from the bar material B1 may be discharged as a product after completion of back machining.

The bar feeder 20 may include a not-shown rail extended along the spindle axis and a not-shown driver for feeding the bar material B1 on the rail toward the front spindle 11 (in the right direction D84). The bar feeder 20 may feed the bar material B1 into the through-hole 11h of the front spindle 11 from the back. The bar feeder 20 may detect absence of the bar material B1 and send a bar-out signal to the NC apparatus 70. The bar feeder 20 may be a finger-type bar feeder and a push-pull-type bar feeder. The finger-type bar feeder may chuck and push the bar material. The push-pull type bar feeder may only push the bar material. The bar material B1 may be a long solid columnar material or a long hollow cylindrical material.

The supporting bed 25 may be located between the front headstock 10 and the back headstock 15 with respect to the Z-axis direction. The supporting bed 25 may have the mounting hole 26 penetrated in the Z-axis direction. The guide bush 14 may be inserted in the mounting hole 26 to be removably attached to the supporting bed 25 as shown in FIG. 1. The guide bush 14 may slidably support the bar material B1 protruded forward from the through-hole 11$h$ of the front spindle 11. The bar material B1 supported by the guide bush 14 may slide in the Z-axis direction. A portion of the bar material B1 protruded from the guide bush 14 toward the back spindle 16 (in the right direction D84) may be machined with a tool TO1. In the lathe from which the guide bush 14 is removed, the front end of the front spindle 11 may be inserted in the mounting hole 26. A portion of the bar material B1 protruded forward (in the right direction D84) from the front spindle 11 may be machined with the tool TO1.

The plural tools TO1 for use to machine the bar material B1 may be attached to the tool post 30. The tool post driver 31 may drive the tool post 30 in the X-axis and Y-axis directions by under control of the NC apparatus 70. The tool post driver 31 may drive the tool post 30 also in the Z-axis direction. The tool post 30 may include a gang tool post as shown in FIG. 3 and a turret tool post. The lathe may include a back working tool post for use to execute back machining on the workpiece W1 held by the back spindle 16. The plural tools TO1 may include a turning tool TO2 such as the cut-off tool TO3 and a rotary tool such as a drill and an endmill. The tool post 30 as shown in FIG. 3 may include a tool post 30A provided with the cut-off tool TO3 and a tool post 30B provided with the contact-type breakage detector 40. The tool post 30A may hold plural turning tools TO2 and the cut-off tool TO3 at the bottom, all protruding toward the spindle axis AX1 side (in the rear direction D86). As shown in FIG. 4, the cut-off tool TO3 may cut off the bar material B1 between the front spindle 11 and the back spindle 16 to separate the workpiece W1 including the end B1$a$ held by the back spindle 16 from the bar material B1. The contact-type breakage detector 40 provided on the tool post 30B may include the sensor 41 protruded toward the spindle axis AX1 side (in the front direction D85).

The tool posts 30A and 30B may integrally move in the X-axis and the Y-axis directions by the single tool post driver 31. The tool posts 30A and 30B may independently move at least in the X-axis direction by separate tool post drivers. The cut-off tool TO3 may be attached to the tool post 30B instead of the tool post 30A. The contact-type breakage detector 40 may be attached to the tool post 30A instead of the tool post 30B.

FIG. 4 is an exemplary plan view showing how the cut-off tool TO3 separates the workpiece W1 from the bar material B1 during continuous machining. The chucks 12 and 17 may be "closed" by the chuck actuators 12$a$ and 17$a$ to tighten the bar material B1. FIG. 4 shows the lathe without the guide bush. When the guide bush 14 is used, the cut-off tool TO3 may cut off the bar material B1 supported by the guide bush 14.

In a state ST1, the chuck 12 of the front spindle 11 may tighten the bar material B1 and the chuck 17 of the back spindle 16 may tighten the workpiece W1 including the end B1$a$ of the bar material B1. An edge TO3$a$ of the cut-off tool TO3 on the tool post 30 may advance in the X-axis direction (in the rear direction D86) until beyond the spindle axis AX1 between the front spindle 11 and the back spindle 16 both rotated under control of the NC apparatus 70. The bar material B1 may be thereby cut off between the front spindle 11 and the back spindle 16. The state ST1 then changes to a state ST2. In the state ST2, the workpiece W1 held by the back spindle 16 may be separate from the bar material B1. Then, the cut-off tool TO3 on the tool post 30 may retreat from between the workpiece W1 and the bar material B1. The state ST2 then changes to a state ST3. The state ST3 may be an example of the first detection timing immediately after the cut off tool TO3 cuts off the bar material B1.

Separation of the workpiece W1 from the bar material B1 possibly fails in the case the cut-off tool TO3 is broken. This is the reason why the cut-off tool breakage detection is required. The lathe 1 of the embodiment may be provided with a non-mechanical-type breakage detector. The non-mechanical-type breakage detector may determine whether the cut-off tool TO3 is broken according to a control parameter for controlling the front spindle 11 during continuous machining. Use of the control parameter enables prompt breakage detection during continuous machining. Such breakage detection may be executed only at the timing immediately after the cut-off tool TO3 cuts off the bar material B1 while the back spindle 16 holds the bar material B1 held by the front spindle 11.

As shown in FIG. 5, the cut off tool TO3 may cut off the bar material B1 also while the back spindle 16 does not hold the bar material B1 held by the front spindle 11. Such cut-off is called a top cut in which the cut-off tool TO3 may cut off the end B1 of the bar material B1 only held by the front spindle 11. The end surface of a fresh bar material B1 just supplied from the bar feeder 20 is chamfered for ease of insertion into the front spindle 11 and the guide bush 14. The end surface of a current bar material B1 that has been used halfway deteriorates with time. It may be necessary to cut off the end surface of such bar material before a start of machining or before a restart of continuous machining for dimensions calculation and positioning of the bar material B1. In a state ST4 in FIG. 5, the chuck 12 of the front spindle 11 may tighten the bar material B1 and the chuck 17 of the back spindle 16 may not. The edge TO3$a$ of the cut-off tool TO3 on the tool post 30 may advance in the X-axis direction (in the rear direction D86) until beyond the spindle axis AX1 while the front spindle 11 is rotated to thereby cut off the bar material B1 in front of the front spindle 11. The state ST4 then changes to a state ST5. In the state ST5, the end B1$a$ may be separate from the bar material B1. Then, the cut-off tool TO3 on the tool post 30 may retreat away from the spindle axis AX1. The state ST5 then changes to a state S6. The state ST6 may be an example of the second detection timing immediately after the cut-off tool TO3 cuts off the bar material B1 while the back spindle 16 does not hold the bar material B1 held by the front spindle 11.

It is quite possible that the end B1$a$ of the bar material B1 remains immediately after the top cut is executed in the case the cut-off tool TO3 is broken, which would affect subsequent machining operations. The back spindle 16 may not hold the bar material B1 held by the first spindle 11 also at the start timing of continuous machining regardless of top cut. The lathe 1 of the embodiment may be provided with the contact-type breakage detector 40 as shown in FIG. 3 in addition to the non-mechanical-type breakage detector.

The contact-type breakage detector 40 as shown in FIG. 3 may include the sensor 41 protruded from the tool post 30B toward the spindle axis AX1 side (in the front direction D85), the cylinder 42 incorporated in the tool post 30B, and the position sensor 43 incorporated in the tool post 30B. The cylinder 42 may be an example of the sensor driver. The position sensor 43 may be an example of the contact detector. The cylinder 42 may retractably hold the sensor 41 so that the sensor 41 may retractably advance in the X-axis direction perpendicular to the spindle axis AX1. The cylinder 42 may apply force on the sensor 41 in the front direction D85. The position sensor 43 may detect the position of the sensor 41 with respect to the cylinder 42. The tool post 30B may move in the front direction D85 to a position beyond the spindle axis AX1 until the tip 41a of the sensor 41 protruded toward the spindle axis AX1 could reach a position beyond the spindle axis AX1 if no end B1a of the bar material B1 remains on this side of the spindle axis AX1. The sensor 41 on the tool post 30B may retractably advance to an advancing position P1 where the sensor 41 could hit the end B1a of the bar material B1 if it remains after the cut-off tool TO3 cuts off the bar material B1. The contact-type breakage detector 40 may detect that the cut-off tool TO3 is broken if the sensor 41 hits the end B1a of the bar material B1 in the advancing position P1. Accordingly, the contact-type breakage detector 40 may determine that the cut-off tool TO3 is not broken if the position sensor 43 detects that the sensor 41 reaches the spindle axis immediately after movement of the tool post 30B. The contact-type breakage detector 40 may determine that the cut-off tool TO3 is broken if the position sensor 43 detects that the sensor 41 hits the end B1 of the bar material B1 and therefore in the position not reaching the spindle axis immediately after movement of the tool post 30B. The contact-type breakage detector 40 adapted to advance the sensor 41 may be an example of the mechanical-type breakage detector.

The contact-type breakage detector 40 may take longer detection time than the non-mechanical-type breakage detector since the sensor 41 on the tool post 30 needs advancement. Use of the contact-type breakage detector during continuous machining would take longer machining time since breakage detection takes longer time. The lathe 1 of the embodiment may use the contact-type breakage detector 40 only at the second detection timing when the non-mechanical-type breakage detector is unavailable. The embodiment may improve accuracy of cut-off tool breakage detection without elongating machining time during continuous machining.

FIG. 6 is an exemplary block diagram schematically showing a configuration of an electrical circuit of the lathe 1 provided with the NC apparatus 70. The NC apparatus 70 may connect to an operation unit 80, the bar feeder 20, the front headstock driver 13, a not-shown rotation driver for the front spindle 11, the chuck actuator 12a, the back headstock driver 18, a not-shown rotation driver for the back spindle 16, the chuck actuator 17a, the tool post driver 31, and the position sensor 43 of the contact-type breakage detector 40. The chuck actuator 12a may drive the chuck 12 of the front spindle 11 as shown in FIG. 1 and FIG. 2. The chuck actuator 17a may drive the chuck 17 of the back spindle 16 as shown in FIG. 1 and FIG. 2. The NC apparatus 70 may include a CPU (Central Processing Unit) 71, a ROM (Read Only Memory) 72 or a semiconductor memory, a RAM (Random Access Memory) 73 or a semiconductor memory, a timer circuit 74, and an I/F (Interface) 75. In FIG. 6, the IF 75 may collectively represent plural interfaces of the operation unit 80, the bar feeder 20, the front headstock driver 13, the chuck actuator 12a, the back headstock driver 18, the chuck actuator 17a, the tool post driver 31, and the position sensor 43. The ROM 72 may store a control program for interpreting and executing a machining program PR2. The ROM 72 may be a rewritable semiconductor memory. The RAM 73 may rewritably store the machining program PR2 written by an operator. The machining program may be also called an NC program. The CPU 71 may use the RAM 73 as a work area to execute the control program PR1 stored in the ROM 72 to enable the NC apparatus 70 to operate accordingly.

The operation unit 80 may include an input 81 and a display 82 to serve as a user interface for the NC apparatus 70. The input 81 may include a button and a touch panel accessible by the operator. The display 82 may include a monitor that displays various information relating to the lathe 1 including the settings given by the operator. The operator can store the machining program PR2 in the RAM 73 by using the operation unit 80 and an external computer (not shown).

The front headstock driver 13 may be provided with a servo amplifier 51 connected to the NC apparatus 70 and a servo motor 52 connected to the servo amplifier 51 to move the front headstock 10 and the front spindle 11 thereon in the Z-axis direction. The servo motor 52 may be an example of the first headstock feed motor. The servo amplifier 51 may control a position and a moving speed of the front headstock 10 with respect to the Z-axis direction under control of the NC apparatus 70. The servo motor 52 may be provided with an encoder 53. The servo motor 52 may rotate upon an instruction from the servo amplifier 51 to move the front headstock 10 in the Z-axis direction through a not-shown feed mechanism and a guide. The feed mechanism may include a ball screw mechanism. The guide may include a linear guide.

The back headstock driver 18 may be provided with a servo amplifier 61 connected to the NC apparatus 70 and a servo motor 62 connected to the servo amplifier 61 to move the back headstock 15 and the back spindle 16 thereon in the Z-axis direction. The servo motor 62 may be an example of the second headstock feed motor. The servo amplifier 61 may control a position and a moving speed of the back headstock 15 with respect to the Z-axis direction under control of the NC apparatus 70. The servo motor 62 may be provided with an encoder 63. The servo motor 62 may rotate upon an instruction from the servo amplifier 61 to move the back headstock 15 in the Z-axis direction through a not-shown feed mechanism and a guide. The feed mechanism may include a ball screw mechanism. The guide may include a linear guide. The back headstock driver 18 may further include a not-shown servo amplifier connected to the NC apparatus 70 and a not-shown servo motor connected to the not-shown servo amplifier to move the back headstock 15 in at least one of the X-axis and the Y-axis directions.

The tool post driver 31 may include a not-shown servo amplifier connected to the NC apparatus 70 and a not-shown servo motor (an example of the tool post feed motor) connected to the not-shown servo amplifier to move the tool post 30 in the X-axis and the Y-axis directions. The servo motor may rotate upon an instruction from the servo amplifier to move the tool post 30 in the X-axis and the Y-axis directions through a not-shown feed mechanism and a guide.

FIG. 7 is an exemplary block diagram schematically showing a control system for a front headstock. The NC apparatus 70 may output a position command CM1 for the front spindle 11 to the servo amplifier 51. A subtraction unit 54 of the servo amplifier 51 may receive the position command CM1 and further a position feedback signal SG1 according to an output from the encoder 53 of the servo motor 52. The subtraction unit 54 may thereby output a position deviation SG2 to a position gain. The position deviation SG2 may be a difference signal between the position command CM1 and the position feedback signal SG1 for the front spindle 11. The servo amplifier 51 may output the position deviation SG2 to the NC apparatus 70. The position gain may receive the position deviation SG2 from the subtraction unit 54 and output a speed command to another subtraction unit 55. The subtraction unit 55 may receive the speed command and further a speed feedback signal according to an output from the encoder 53. The subtraction unit 55 may modify the speed command according to the speed feedback signal and output the modified speed command to a speed gain. The speed gain may receive the modified speed command and accordingly output a torque command to the servo motor 52. The servo motor torque may be proportional to current flowing through the servo motor 52. The torque command may correspond to current flowing through the servo motor 52.

The NC apparatus 70 may acquire the position deviation SG2 from the servo amplifier 51 to determine whether the cut-off tool TO3 is broken during continuous machining. The position deviation SG2 may be an example of the control parameter for controlling the front spindle 11. The control system for the back headstock 15 may be similar to that for the front headstock 10 as described above. The control system for the tool post 30 may be similar to that for the front headstock 10 as described above.

(3) Exemplary Machining Operation:

FIG. 8 is an exemplary flow chart schematically showing a machining to be executed according to the machining program PR2 (FIG. 6). The NC apparatus 70 may execute the control program PR1 to execute the machining program PR2. The RAM 73 may store a mechanical-type detection flag indicating whether the contact-type breakage detector 40 is used. The NC apparatus 70 may turn the flag on ("1", for example) to execute the machining operation.

Upon a start of continuous machining, the NC apparatus 70 may determine whether this is a first machining round (Step S102). The first machining round may correspond to the time immediately after power-on or the time of a restart of continuous machining after interruption for a period of time during which power continues on. The front spindle 11 side may stop in the state ST2 (FIG. 4) where the edge TO3a of the cut-off tool TO3 is in the position exceeding the spindle axis AX1. The back spindle 16 side may retreat to be in a backward origin position (not shown) in the state ST5 (FIG. 5). The chuck 17 of the back spindle 16 in the origin position may or may not tighten the workpiece W1. No top cut may be required for the bar material B1 held by the front spindle 11 if the cut-off tool TO3 hits and thereby position the bar material B1. The NC apparatus 70 may turn the mechanical-type detection flag on (a step S104) for the first machining round. The process may then proceed to a step S106. Otherwise, the process may immediately proceed to S106 for a second machining round.

The NC apparatus 70 may determine whether a top cut (FIG. 5) has been executed (S106). The bar material B1 may need a top cut to set a position reference when a fresh material B1 is fed to the front spindle 11 or when continuous machining is resumed. The top cut may be executed upon a top cut command described in the machining program PR2 before a description of continuous machining. During continuous machining, no top cut may be required for the bar material B1 positioned everytime the cut-off is executed. The machining program PR2 may have no description of a top cut command while continuous machining is being executed. The NC apparatus 70 may turn the mechanical-type detection flag on (S108) if the top cut has been executed. The process may then proceed to a step S110. Otherwise, the process may immediately proceed to the step S110.

At the step S110, the NC apparatus 70 may execute steps S112 to S114 if the mechanical-type detection flag is on and then the process may proceed to a next step S116. Otherwise, the process may immediately proceed to the step S116. At the step S112, the NC apparatus 70 may execute the mechanical-type breakage detection, which determines whether the cut-off tool TO3 is broken according to a detection result by the contact-type breakage detector 40. The mechanical-type breakage detection may be executed at the second detection timing, which is different from the first detection timing (the state ST3 in FIG. 4). The first detection timing may be the timing immediately after the cut off is executed in the state the back spindle 16 holds the bar material B1 held by the front spindle 11. The second detection timing may be the timing when the back spindle 16 may retreat backward as in the state ST6 (FIG. 5). Upon completion of the mechanical-type detection, the NC apparatus 70 may turn the mechanical-type detection flag off ("0" for example) (S114). The process may then proceed to the step S116.

FIG. 9 is an exemplary flow chart schematically showing the mechanical-type breakage detection in the step S112 (FIG. 8). At a step S202, the NC apparatus may move the tool post 30B in the front direction D85 until the tip 41a of the sensor 41 protruded toward the spindle axis AX1 as shown in FIG. 3 could reach a position beyond the spindle axis AX1 if no end B1a of the bar material B1 remains on this side of the spindle axis AX1. The NC apparatus 70 may drive the tool post driver 31 to move the tool post 30B. At the step S202, the sensor 41 may advance toward the spindle axis AX1.

The NC apparatus 70 may then acquire a detection position of the sensor 41 by the position sensor 43 and accordingly determine whether the sensor reaches the spindle axis AX1 (a step S204).

If the cut-off tool is not broken, no end B1a of the bar material B1 remains. The sensor can reach the spindle axis AX1 without hitting the end B1a of the bar material B1. The NC apparatus 70 may determine that the cut-off tool is not broken if the position sensor 43 detects that the sensor 41 reaches the spindle axis AX1. The process may then proceed to a step S206. At the step S206, the NC apparatus 70 may move the tool post 30B in such direction as the sensor 41 retreat from a moving path of the bar material B1 and then finish the mechanical-type breakage detection. The NC apparatus 70 may turn the mechanical-type detection flag off (S114 in FIG. 8). The process may then proceed to the step S116.

In the case the cut-off tool is broken, the end B1a of the bar material B1 remains on this side of the spindle axis AX1. The sensor 41 may hit the end B1a of the bar material B1 and fails to reach the spindle axis AX1. The position sensor 43 may detect that the sensor 41 stays in a position not reaching the spindle axis AX1. The NC apparatus 70 may accordingly determine that the cut-off tool is broken. The process may then proceed to a step S208. At the step S208, the NC apparatus 70 may output an alarm indicating breakage of the cut-off tool TO3 and shut off the machine. Outputting the alarm may include displaying an alarm message on the display 82, reproducing an alarm sound from a not-shown speaker, and transmitting an alarm signal to a not-shown computer. The operator may exchange the cut-off tools and resume machining from the step S102 (FIG. 8).

The contact-type breakage detector 40 may determine that the cut-off tool TO3 is not broken if the sensor 41 advanced to the advancing position P1 does not hit the end B1a of the bar material B1. The contact-type breakage detector 40 may determine that the cut-off tool TO3 is broken if the sensor 41 advanced to the advancing position P1 hits the end B1a of the bar material B1. The NC apparatus 70 may determine whether the cut-off tool TO3 is broken according to a detection result by the contact-type breakage detector 40.

At the step S116 in FIG. 8, the NC apparatus 70 may execute a front machining on the end B1a of the bar material B1 held by the front spindle 11. The back spindle 16 may then hold the workpiece W1 whose front end has been machined. The NC apparatus 70 may then execute a back machining on the workpiece held by the back spindle 16 and discharge a product. The NC apparatus 70 may actuate the front headstock driver 13 to move the front headstock 10. The NC apparatus 70 may actuate the not-shown rotation driver to rotate the front spindle 11. The NC apparatus 70 may actuate the back headstock driver 18 to move the back headstock 15. The NC apparatus 70 may actuate the not-shown rotation driver to rotate the back spindle 16. The NC apparatus may actuate the tool post driver 31 to move the tool post 30.

Upon completion of the front machining, the back spindle 16 may hold the end B1a of the bar material B1 held by the front spindle. The NC apparatus 70 may then cut off the bar material B1 with the cut-off tool TO3 (a step S118). First, the NC apparatus 70 may move the back headstock 15 by the back headstock driver 18 to tighten the end B1a of the bar material B1 protruded from the front headstock 10 with the chuck 17 of the back spindle 16. This is the state ST1 in FIG. 4. Next, the NC apparatus 70 may rotate the front spindle 11 and the back spindle 16 at the same speed. The NC apparatus 70 may move the tool post 30 by the tool post driver 31 and use the cut-off tool TO3 to separate the workpiece W1 having the end B1a of the bar material B1 from the bar material B1. The cut-off tool TO3 may cut off the bar material B1 or separate the workpiece W1 from the bar material B1. This is the state ST2 in FIG. 4 where the separation is complete.

Upon completion of the cut-off, the NC apparatus 70 may move the tool post 30 in the X-axis direction by the tool post driver 31 to bring the cut-off tool TO3 away from the bar material B1 (a state ST3 in FIG. 4). The NC apparatus 70 may then execute a non-mechanical-type breakage detection (a step S120) at the first detection timing (the state ST3 in FIG. 4) immediately after the cut-off is executed while the back spindle 16 holds the bar material B1 held by the front spindle 11. The non-mechanical-type breakage detection may be executed in accordance with a non-mechanical-type breakage detection command described in a continuous machining section of the machining program PR2. No cut-off may be executed while the back spindle 16 holds the bar material B1 held by the front spindle 11 prior to continuous machining. No non-mechanical-type breakage detection command may be described prior to the continuous machining section of the machining program PR2.

FIG. 10 is an exemplary flow chart schematically showing the non-mechanical-type breakage detection at the step S120. The NC apparatus 70 may start a control of separating the back spindle 16 (the back headstock 15) from the stopped front spindle 11 (the front headstock 10) (a step S302) in the Z-axis direction. Specifically, the NC apparatus 70 may output a position command to the servo amplifier 61 of the back headstock driver 18 to bring the back spindle 16 away from the front spindle 11. The NC apparatus 70 may have given the position command CM1 to the servo amplifier 51 of the front headstock driver 13 (FIG. 7) to keep the front spindle 11 at the current position. If the cut-off tool TO3 is normal, the workpiece W1 has been separated from the bar material B1, which permits movement of the back spindle 16 away from the front spindle 11. In the case the cut-off tool TO3 is broken, the back spindle 16 may keep connection with the front spindle 11 via the bar material B1, which prevents movement of the back spindle 16 away from the front spindle 11. The front headstock 10 provided with the front spindle 11 may receive pulling force from the bar material B1 toward the back headstock 15. The servo amplifier 51 may provide the position feedback signal SG1 to the subtraction unit 54 according to an output from the encoder 53 of the servo motor 52 to keep the front spindle 11 at the position commanded by the position command CM1 against the pulling force. The generated position feedback signal SG1 may represent a further position at the back (in the left direction D83) than the position commanded by the position command CM1. The front spindle 11 may be thereby almost kept in the position commanded by the position command CM1 with respect to the Z-axis direction.

Upon completion of the step S302, the NC apparatus 70 may acquire the position deviation SG2 from the servo amplifier 51 of the front headstock driver 13. The position deviation SG2 may be a difference signal between the position command CM1 and the position feedback signal SG1. Specifically, the NC apparatus 70 may acquire a position deviation value d1, which is an absolute value of the position deviation SG2. The NC apparatus may accordingly determine whether the cut-off tool TO3 is broken in a step S306 and subsequent steps.

If the cut-off tool TO3 is normal, the front headstock 10 may receive no puling force toward the back headstock 15, which does not increase the position deviation value d1 regardless of separation control amount for the back spindle 16. In the case the cut-off tool TO3 is broken, the front headstock 10 may receive pulling force toward the back headstock 15, which increase the position deviation value d1 according to separation control amount for the back spindle 16. The NC apparatus 70 may determine whether the acquired position deviation value d1 exceeds a threshold Td1 in the step S306. The front spindle 11 has been kept at the position with respect to the Z-axis direction by the position command CM1 from the servo amplifier 51. The front spindle 11 can thereby stay at the commanded position regardless of an increase in the position deviation value d1.

If the position deviation value d1 does not exceed the threshold Td1, the NC apparatus 70 may determine whether the separation control amount for the back spindle 16 reaches a set amount in a step S308. If the separation control amount does not reach the set amount, the process may return to the step S306. If the separation control amount does reach the set amount, the NC apparatus 70 may determine that the cut-off tool TO3 is not broken and finish the non-mechanical-type breakage detection. The process may then proceed to the step S122 (FIG. 8).

If the position deviation value d1 exceeds the threshold Td1, the NC apparatus 70 may determine that the cut-off tool TO3 is broken. The process may then proceed to a step S310 where the NC apparatus 70 may output an alarm indicating breakage of the cut-off tool TO3 and shut off the machine. Outputting the alarm may include displaying an alarm message on the display 82, reproducing an alarm sound from a not-shown speaker, and transmitting an alarm signal to a not-shown computer. The operator may exchange the cut-off tools and resume machining from the step S102 (FIG. 8).

As described above, the NC apparatus 70 may determine that the cut-off tool is broken if the position deviation SG2 exceeds the set amount under separation control of the back spindle 16 from the stopped front spindle 11 in the state ST3 in FIG. 4. The NC apparatus 70 may determine that the cut-off tool is normal if the position deviation SG2 does not exceed the set amount.

In the step S122 (FIG. 8), the NC apparatus 70 may determine whether the NC apparatus receives a bar-out signal indicating that the spindle 11 is running out of the bar material B1. If the NC apparatus 70 does not receive the bar-out signal, the process may return to the step S102 to repeat machining and execute the non-mechanical-type breakage detection during continuous machining.

In the case the NC apparatus 70 receives the bar-out signal, the NC apparatus 70 may turn the mechanical-type detection flag on (S124) and execute a material exchanging operation (S126). Specifically, the NC apparatus 70 may discharge the residual material and introduce a fresh material B1 from the bar feeder 20 to the front spindle 11. The NC apparatus 70 may then execute the top-cut (FIG. 5) in a step S128. The process may then return to the step S102. At the step S112, the NC apparatus 70 may execute the mechanical-type breakage detection, which determines whether the cut-off tool TO3 is broken according to a detection result by the contact-type breakage detector 40. The mechanical-type breakage detection may be executed at the timing immediately after the cut off is executed while the back spindle 16 does not hold the bar material B1 held by the front spindle 11. The steps S124 and S128 can be skipped if a top-cut command is described in a section prior to a description of continuous machining in the machining program PR2.

As described above, at the first detection timing (the status ST3 in FIG. 4) immediately after the cut-off tool cuts off the material while the opposite spindle 16 holds the bar material B1 held by the spindle 11, the NC apparatus 70 may determine whether the cut-off tool TO3 is broken according to the position deviation SG2, which is the control parameter for controlling at least one of the spindle 11 and the opposite spindle 16. Determination at the first detection timing may not rely on the reciprocating sensor 41, which prevents elongation of machining time during continuous machining. The NC apparatus 70 may determine whether the cut-off tool TO3 is broken according to a detection result by the contact-type breakage detector 40 at the second detection timing (the status ST6 in FIG. 5) immediately after the cut-off tool cuts off the material while the opposite spindle 16 does not hold the bar materiral B1 held by the spindle 11 or at the continuous machining start timing. The NC apparatus 70 can thereby determine that the cut-off tool is broken even at the second detection timing when the control parameter is unavailable for the determination. Accordingly, the embodiment can provide a lathe capable of improving accuracy of cut-off tool breakage detection without elongating machining time during continuous machining.

(4) Modified Embodiments:

The invention may be embodied in various modifications. For example, the second detection timing for the mechanical-type breakage detection may be limited to one of the timings; the timing immediately after the top cut is executed and the continuous machining start timing.

In the step S120 (FIG. 8), the NC apparatus 70 may determine whether the cut-off tool TO3 is broken further according to the position deviation or the deviation signal between the position command and the position feedback signal for the back spindle 16. For example, the NC apparatus 70 may determine that the cut-off tool TO3 is broken in either case that the position deviation SG2 of the front spindle 11 exceeds a first set amount or the position deviation of the back spindle 16 exceeds a second set amount. Alternatively, the NC apparatus 70 may determine whether the cut-off tool TO3 is broken only according to the position deviation of the back spindle 16. In the state ST3 (FIG. 4), the NC apparatus 70 may control separation of the front spindle 11 from the stopped back spindle 16 in the Z-axis direction to determine that the cut off tool is broken if the position deviation exceeds the set amount and that the cut off tool is normal if the position deviation does not exceed the set amount.

The non-mechanical-type breakage detection may be otherwise executed. For example, the control parameter for controlling at least one of the front spindle 11 and the back spindle 16 may include a torque (such as a torque command in FIG. 7) given to the servo motor from the speed gain as described in the means (a2) and (a5). The NC apparatus 70 may determine that the cut-off tool is broken if the torque exceeds the set amount. The NC apparatus 70 may determine that the cut-off tool is normal if the torque does not exceed the set amount. The control parameter may not be limited to the position deviation or the torque in the Z-axis direction. The control parameter may include a speed control parameter in the Z-axis direction and a rotation control parameter for at least one of the front spindle 11 and the back spindle 16 as described in the means (a6) and (a7).

In the step S112 (FIG. 8), the NC apparatus 70 may execute the mechanical-type breakage detection by the means (b1) to (b3) as described above. For example, the NC apparatus 70 may execute the mechanical-type breakage detection by the means (b2) when the sensor 41 (FIG. 3) is unretractably secured to the tool post 30B. The NC apparatus 70 may control movement of the tool post 30B to advance the sensor 41 to the advancing position P1 where the tip 41a of the sensor 41 protruded toward the spindle axis AX1 could hit the end B1a of the bar material B1 in the case the end B1a remains on this side of the spindle axis AX1. The tool post servo amplifier (an example of the contact detector) connected to the NC apparatus 70 may issue a torque command to the tool post feed motor (an example of the sensor driver) and a corresponding torque value to the NC apparatus 70. The torque value may exceed the set amount in the case the tip 41a of the sensor 41 hits the end B1a of the bar material B1 remaining on this side of the spindle axis AX1. The torque value may not exceed the set amount if the end B1a of the bar material B1 has been normally cut and the sensor 41 does not hit the end B1a. The tool post servo amplifier may thereby detect whether the sensor 41 advanced toward the spindle axis AX1 hits the end B1a of the bar material B1. The NC apparatus 70 may acquire the torque value from the servo amplifier of the tool post driver 31 to determine that the cut-off tool is broken if the touque exceeds the set amount.

The NC apparatus 70 may apply a torque limit on movement of the tool post 30 to determine whether the cut-off tool TO3 is broken by detecting the position of the tool post 30 provided with the sensor 41 protruded toward the spindle axis AX1. The tool post servo amplifier connected to the NC apparatus 70 may only output the position of the tool post 30 to the NC apparatus 70. In the case the end B1a of the bar material B1 remains, the sensor 41 advanced toward the spindle axis AX1 does only reach a position on this side of the spindle axis AX1. The tool post servo amplifier may detect the position. If the end B1a of the bar material B1 has been normally cut, the sensor 41 does reach the spindle axis AX1. The tool post servo amplifier may detect the position. The tool post servo amplifier may detect whether the sensor 41 advanced toward the spindle axis AX1 hits the end B1a of the bar material B1. The NC apparatus may acquire the position of the tool post 30 from the servo amplifier of the tool post driver 31 to determine that the cut-off tool is broken if the detected position is the position on this side of the spindle axis AX1.

The NC apparatus 70 may execute the mechanical-type breakage detection by the means (b3) The tool post 30 may be provided with a movable sensor and a proximity sensor (an example of the contact detector) adapted to detect movement of the sensor. The proximity sensor may turn on if the sensor moves relative to the tool post 30 and keep off if the sensor does not move relative to the tool post 30. The tool post feed motor is an example of the sensor driver adapted to advance the sensor in the direction perpendicular to the spindle axis AX1. The NC apparatus 70 may control movement of the tool post 30 to advance the sensor to the advancing position where the sensor could hit the end B1a of the bar material B1 in the case the end B1a remains on this side of the spindle axis AX1. In the case the sensor hits the end B1a of the bar material B1, the proximity sensor may detect movement of the sensor and thereby turn on. If the end B1a has been normally cut off, the sensor may not move and the proximity sensor may keep off. The NC apparatus 70 may determine that the cut-off tool is broken if the proximity sensor turns on or if the proximity sensor detects movement of the sensor.

The rotation driver (an example of the sensor driver) and the position sensor (an example of the contact detector) may be provided near the spindle axis AX1, not on the tool post 30. The NC apparatus 70 may execute the mechanical-type breakage detection by the (b1) means. In the case the sensor hits the end B1a of the bar material B1, the NC apparatus 70 may determine that the cut-off tool is broken if the detected position of the sensor is the position on this side of the spindle axis AX1. If the end B1a has been normally cut, the NC apparatus 70 may determine that the cut-off tool is normal if the detected position represents the sensor has reached the spindle axis AX1.

The sensor may advance by an electronic single axis linear motion robot.

As described above, the invention may provide a lathe capable of improving accuracy of cut-off tool breakage detection without elongating machining time during continuous machining. The fundamental functions and effects are available even in a technology only comprising elements of independent claims. The elements described in the embodiments may be replaced to each other and any combination of the elements may be changed in the scope of the invention. Any prior art may be replaced with the element described in the embodiments and any combination of the prior art and the element may be changed in the scope of the invention.

What is claimed is:

1. A lathe comprising:
a spindle capable of releasably holding a bar material;
an opposite spindle capable of releasably holding an end of the bar material protruded from the spindle;
a tool post on which a cut-off tool is removably attached to cut off the bar material held by the spindle so as to separate the end of the bar material from the bar material;
a controller adapted to control operations of the spindle, the opposite spindle, and the tool post; and
a contact-type breakage detector provided with a sensor retractably advancing to an advancing position where the sensor could hit the end of the bar material if it remains after the cut-off tool cuts off the bar material, the contact-type breakage detector being capable of detecting breakage of the cut-off tool if the sensor hits the end of the bar material in the advancing position,
wherein the controller performs a non-mechanical-type breakage detection to determine whether the cut-off tool is broken according to a control parameter for controlling at least one of the spindle and the opposite spindle to make the spindle and the opposite spindle move away from each other at a first detection timing immediately after the cut-off tool cuts off the bar material while the opposite spindle holds the bar material held by the spindle, and performs a mechanical-type breakage detection to determine whether the cut-off tool is broken according to a detection result by the contact-type breakage detector at a second detection timing different from the first detection timing.

2. The lathe of claim 1, wherein the second detection timing comprises at least one of timings comprising a timing immediately after the cut-off tool cuts off the bar material while the opposite spindle does not hold the bar material held by the spindle and a timing of a start of continuous machining of the bar material.

3. The lathe of claim 2, wherein the control parameter comprises a position deviation which is a difference signal between a position command and a position feedback signal for a first spindle where the first spindle comprises one of the spindle and the opposite spindle and a second spindle comprises the other of the spindle and the opposite spindle, and the controller controls separation of the second spindle from the stopped first spindle at the first detection timing and determines that the cut-off tool is broken if the position deviation exceeds a set value and that the cut-off tool is not broken if the position deviation does not exceed the set value.

4. The lathe of claim 3, the contact-type breakage detector further comprising a sensor driver capable of advancing the sensor in a direction perpendicular to a spindle axis of the spindle and a contact detector capable of detecting whether the sensor advanced toward the spindle axis hits the end of the bar material, wherein the contact-type breakage detector detects breakage of the cut-off tool if the contact detector detects that the sensor hits the end of the bar material.

5. The lathe of claim 2, the contact-type breakage detector further comprising a sensor driver capable of advancing the sensor in a direction perpendicular to a spindle axis of the spindle and a contact detector capable of detecting whether the sensor advanced toward the spindle axis hits the end of the bar material, wherein the contact-type breakage detector detects breakage of the cut-off tool if the contact detector detects that the sensor hits the end of the bar material.

6. The lathe of claim 1, wherein the control parameter comprises a position deviation which is a difference signal between a position command and a position feedback signal for a first spindle where the first spindle comprises one of the spindle and the opposite spindle and a second spindle comprises the other of the spindle and the opposite spindle, and the controller controls separation of the second spindle from the stopped first spindle at the first detection timing and determines that the cut-off tool is broken if the position deviation exceeds a set value and that the cut-off tool is not broken if the position deviation does not exceed the set value.

7. The lathe of claim 6, the contact-type breakage detector further comprising a sensor driver capable of advancing the sensor in a direction perpendicular to a spindle axis of the spindle and a contact detector capable of detecting whether the sensor advanced toward the spindle axis hits the end of the bar material, wherein the contact-type breakage detector detects breakage of the cut-off tool if the contact detector detects that the sensor hits the end of the bar material.

8. The lathe of claim 1, the contact-type breakage detector further comprising a sensor driver capable of advancing the sensor in a direction perpendicular to a spindle axis of the spindle and a contact detector capable of detecting whether the sensor advanced toward the spindle axis hits the end of the bar material, wherein the contact-type breakage detector detects breakage of the cut-off tool if the contact detector detects that the sensor hits the end of the bar material.

9. A method of detecting cut-off tool breakage in a lathe comprising:
- a spindle capable of releasably holding a bar material;
- an opposite spindle capable of releasably holding an end of the bar material protruded from the spindle;
- a tool post on which a cut-off tool is removably attached to cut off the bar material held by the spindle so as to separate the end of the bar material from the bar material; and
- a contact-type breakage detector provided with a sensor retractably advancing to an advancing position where the sensor could hit the end of the bar material if it remains after the cut-off tool cuts off the bar material, the contact-type breakage detector being capable of detecting breakage of the cut-off tool if the sensor hits the end of the bar material in the advancing position, the method comprising:
- performing a non-mechanical-type breakage detection to determine whether the cut-off tool is broken according to a control parameter for controlling at least one of the spindle and the opposite spindle to make the spindle and the opposite spindle move away from each other at a first detection timing immediately after the cut-off tool cuts off the bar material while the opposite spindle holds the bar materiral held by the spindle, and
- performing a mechanical-type breakage detection to determine whether the cut-off tool is broken according to a detection result by the contact-type breakage detector at a second detection timing different from the first detection timing.

* * * * *